United States Patent [19]

Chun

[11] Patent Number: 5,350,897
[45] Date of Patent: Sep. 27, 1994

[54] HYBRID LASER-PLASMA ARC CUTTING APPARATUS COMBINED WITH A PUNCH PRESS

[75] Inventor: Victor L. Chun, Charlotte, N.C.

[73] Assignee: Murata Machinery, Ltd., Kyoto, Japan

[21] Appl. No.: 92,265

[22] Filed: Jul. 15, 1993

[51] Int. Cl.$^5$ .................. B23K 10/00; B23K 9/013; B23K 26/00
[52] U.S. Cl. .................. 219/121.39; 219/121.48; 219/121.44; 219/121.67; 266/48
[58] Field of Search .................. 219/121.47, 121.37, 219/121.38, 121.46, 121.59, 121.67, 121.7; 266/68, 77

[56] References Cited

U.S. PATENT DOCUMENTS

| | | | |
|---|---|---|---|
| Re. 31,042 | 9/1982 | Clark et al. | 219/68 |
| 4,434,349 | 2/1984 | Tsutsumi | 219/121.67 |
| 4,698,480 | 10/1987 | Klingel | 219/121 LG |
| 5,084,602 | 1/1992 | Gamo et al. | 219/69.12 |
| 5,168,610 | 12/1992 | Ichimura et al. | 219/121.67 |
| 5,218,181 | 6/1993 | Shintani | 219/121.54 |

Primary Examiner—Mark H. Paschall
Attorney, Agent, or Firm—John R. Benefiel

[57] ABSTRACT

A sheet material hybrid cutting apparatus has a laser beam cutting head mounted side-by-side with a plasma arc cutting head on a shuttle carrier plate movably mounted to enable positioning of either cutting head a single cutting station. The cutting heads are mounted in a punch press with a punching station offset from the cutting station to provide punching of a sheet material workpiece moved across a table by a carriage as well as contouring by either of the laser beam or plasma arc cutting heads.

4 Claims, 6 Drawing Sheets

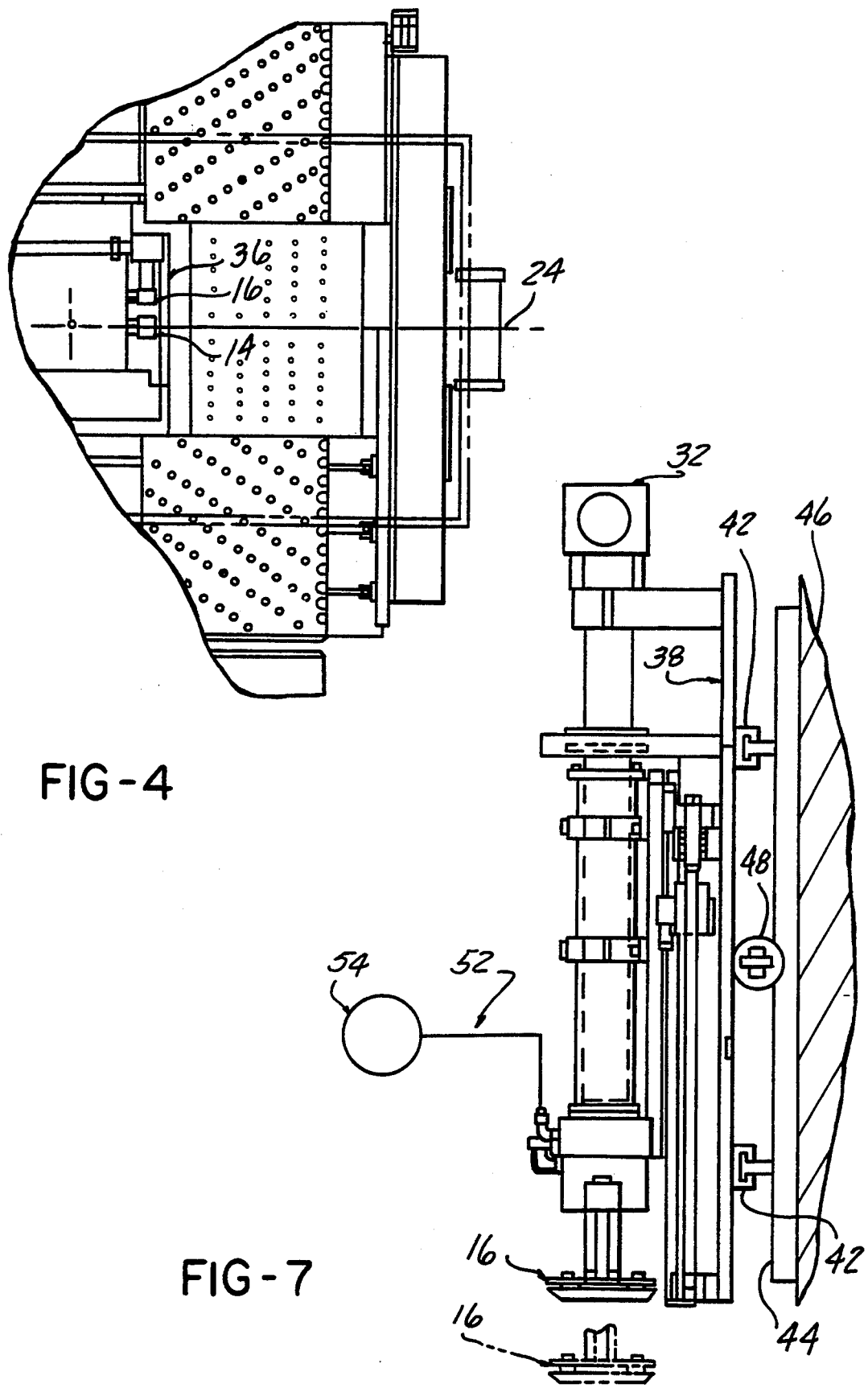

HYBRID LASER-PLASMA ARC CUTTING APPARATUS COMBINED WITH A PUNCH PRESS

BACKGROUND OF THE INVENTION

The present invention concerns cutting large sheet material workpieces. For many years this process has been carried out by means of punch presses, by the use of punch and die sets. The punch and die sets are often mounted in respective turret holders, which move a selected punch and die set to a punching station. The workpiece is supported on a large table and transported by means of a carriage mechanism having grippers holding the workpiece to move the sheet so as to bring a selected location whereat a particular hole is to be formed to the punching station.

In some instances, large or contoured openings or edge contours are required, which in some instances could not be carried out by use of punch and die sets. In other situations, the tooling costs would be excessive.

Such openings may be formed by a nibbling operation, in which successive punching along a line as the workpiece is moved past the punching station forms the contoured opening, but slight scalloping of the edge results, which is sometimes unacceptable.

In more recent years, laser contour cutting of such workpieces has been employed in which a powerful laser beam is directed through the workpiece as the workpiece is transported along a selected path.

Another known approach involves plasma arc cutting, in which a plasma arc is generated similarly directed through the workpiece to cut a line as the workpiece is moved past the arc.

Such laser and plasma arc cutting is capable of forming almost any contour shape and eliminates the need for high cost special punches and dies.

There has also been heretofore provided a hybrid combination of a punch press and a laser beam cutting head as well as a hybrid combination of a punch press with a plasma arc cutting head.

In these hybrid punch presses, the laser beam or plasma arc cutting head is positioned at a fixed offset to the punching station. The CNC controls appropriately move the workpiece with respect to the offset location in executing the contoured cutting of the workpiece.

At the location of the laser or plasma arc cutting station, a discharge chute and/or dust collector must be provided to receive the discharging beam or arc and to collect the slag and exhaust the gases incidental to the cutting process. Cutting with a laser beam and plasma arc have respective advantages and disadvantages. The plasma arc has a higher cutting speed and cuts through a wide variety of metal such as aluminum, stainless steel, brass, and steel. The plasma arc also has the capability of cutting relatively thick material.

The disadvantages include the fact that the kerf is wider, and the kerf angle is greater. More slag is produced, and the accuracy of cutting is not as good as the laser beam.

The laser beam, on the other hand, has the advantage of being very clean and accurate and has a narrower, straighter kerf and cuts materials other than metal, i.e., plastic, wood, composite, etc.

The disadvantage of the laser beam is it has a slower cutting speed, a higher energy consumption, it is more difficult to cut thick material and more difficult to cut certain metal materials, i.e., stainless steel, aluminum, and brass.

In order to have access to the respective capabilities of each device, it has heretofore been required to purchase both types of equipment incurring the high cost of both types of equipment and the need for floor space for both presses.

SUMMARY OF THE INVENTION

The present invention comprises the combination of both a plasma arc and laser beam cutting head mounted on a shuttle carrier plate which is shifted side-to-side to bring either the plasma arc or laser beam cutting head to a common cutting station. A common discharge chute and dust collector is located at the cutting station.

The laser beam and plasma jet cutting heads are each retracted when not in use and shifted to the non cutting position and extended when at the cutting station with the cutting operation initiated.

The shuttle carrier plate has the laser and plasma arc cutting heads mounted thereto vertically disposed and in parallel to each other. The shuttle plate is in turn mounted on linear guides affixed to a frame with a side shuttle cylinder used to actuate the shuttle movement of the carrier plate side-to-side to bring one or the other of the plasma arc cutting head or laser beam cutting head in position at the cutting station.

Both the plasma arc and laser beam cutting apparatus are combined in a punch press, with the shuttle carrier plate fixed to the punch press frame and the cutting location located at a point just forward of the punching station of the press.

A common discharge chute and dust collector is located beneath the table at the plasma arc-laser beam cutting station.

A mobile telescoping tube connection extends between the laser beam generator and the laser beam cutting head to accommodate the carrier shuttle plate motion. Flexible tubing connects the plasma arc apparatus to the plasma arc cutting head.

DESCRIPTION OF THE DRAWINGS

FIG. 4 is a plan view of the apparatus shown in FIGS. 1-3 with the plasma arc cutting head in operation.

FIG. 7 is a side elevational view of the laser beam cutting head and shuttle mounting mechanism with the laser beam cutting head shown in fragmentary form in phantom lowered for cutting operation.

DETAILED DESCRIPTION

In the following detailed description certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
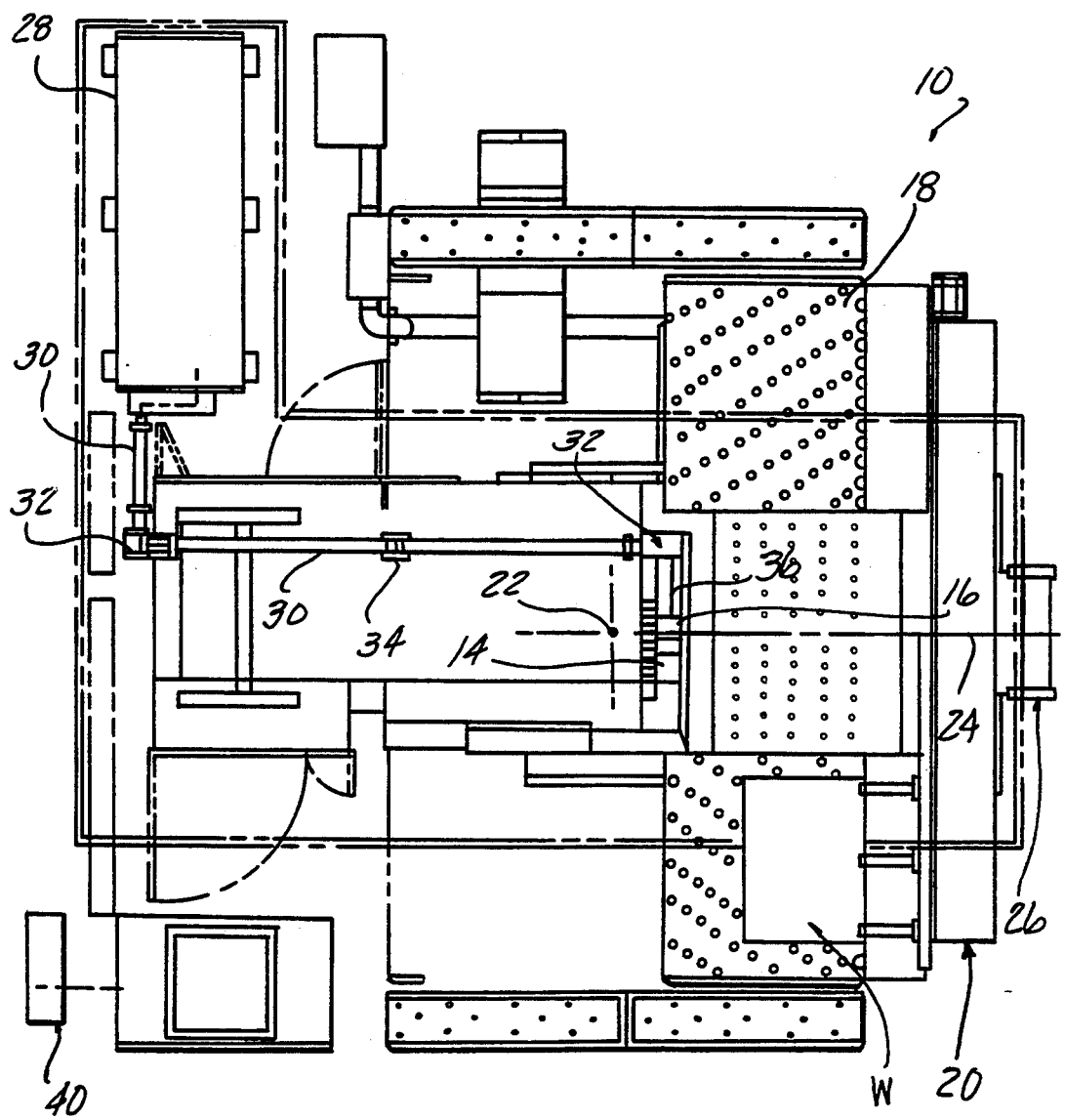
FIG. 1 is a plan view of a punch press incorporating the laser beam and plasma arc hybrid cutting apparatus in accordance with the present invention.
Figure 2:
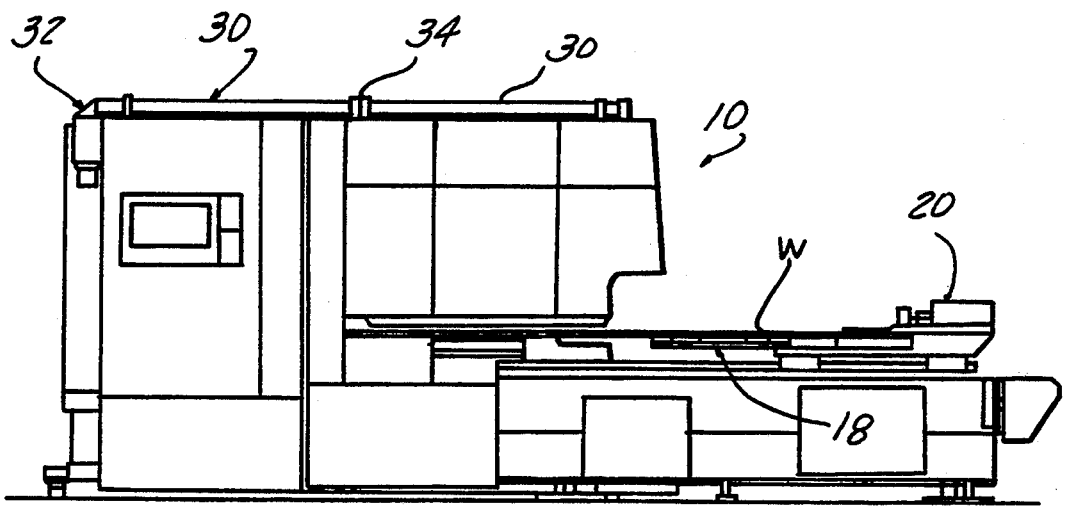
FIG. 2 is a side elevational view of the apparatus shown in FIG. 1.
Figure 3:
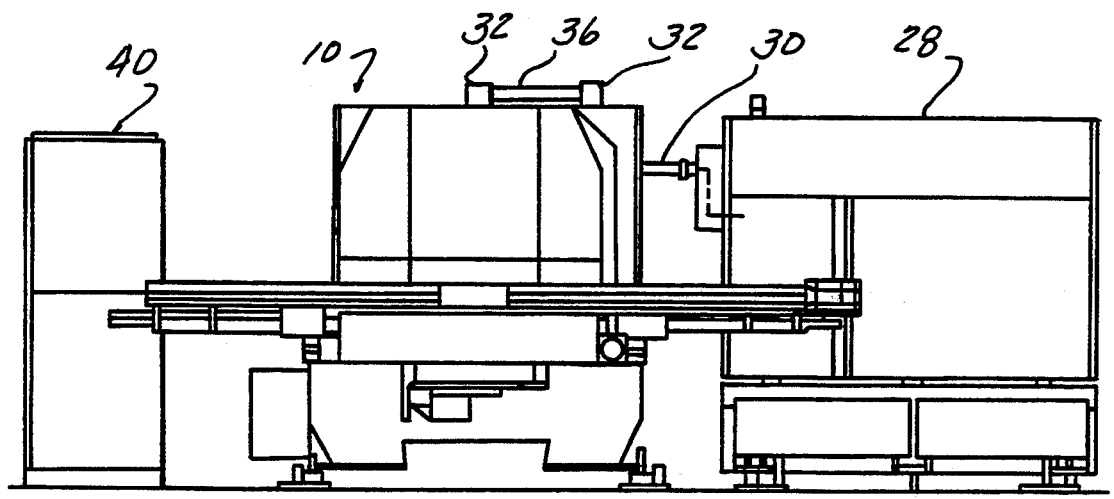
FIG. 3 is a front elevational view of the apparatus shown in FIG. 1, with the laser beam cutting head in operation.

Referring to the drawings and particularly FIGS. 1–3, a punch press 10 is depicted, which, according to the concept of the present invention, is combined with both a plasma arc cutting head 14 and a laser cutting head 16 to form a hybrid cutting and punching apparatus.

The punch press 10 is provided with a work table 18 which supports a sheet metal workpiece W shown in FIG. 2, which is clamped and driven by a carriage-gripper mechanism 20 such as to enable positioning a selected point on the workpiece W beneath a punching station 22 located on the center line 24 of the punch press 10.

Suitable punch and die tooling, typically mounted in rotary turrets, are controllably driven to align a selected punch and die set at the punching station 22 to conduct a punching operation on the part of the workpiece at the punching station to which it has been driven by the carriage mechanism 20 under CNC control.

Such punch presses are very well known in the art, and the details thereof are therefor not here set out. Various accessories and auxiliary equipment are typically employed, for example, a workpiece collection conveyor 26 may be provided.

According to the concept of the present invention, the press 10 is equipped with both a plasma arc cutting head 14 and a laser beam cutting head 16 which are alternatively able to be positioned on the center line 24 of the punch press 10 when either laser beam or plasma arc cutting is to be carried out on the workpiece. A suitable commercial laser beam generating apparatus 28 is provided with a system of tubes 30, beam benders 32, and tube couplings 34 directing the laser beam from the generator 28 to the laser beam cutting head 16. A telescoping enclosure tube section 36 is employed for a purpose as will be described hereinafter.

Similarly a plasma arc power and coolant supply 40 is provided which provides high voltage electrical energy to the plasma arc cutting head 14 in the manner well known in the art.

In the position shown in FIG. 1, the laser beam cutting head 16 is located on the punch press center 24 offset forwardly from the punching station location 22. In FIG. 4 the laser beam cutting head 16 is retracted and shifted out of alignment with the punch press centerline 24 and the plasma arc cutting head 14 is shifted into position.

Figure 5:
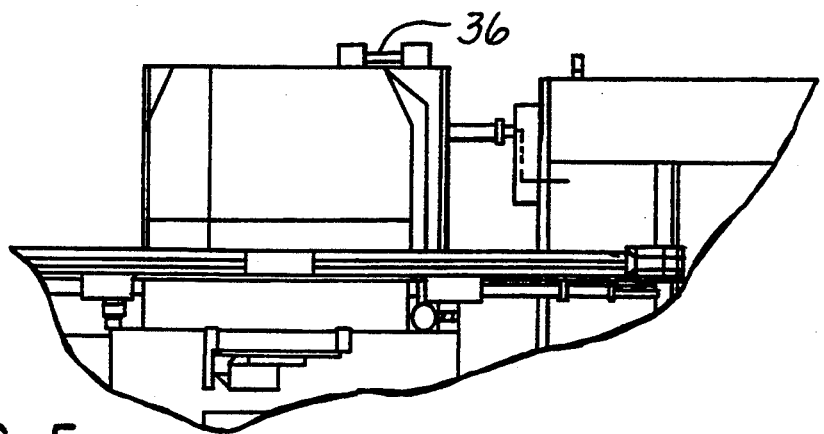
FIG. 5 is a front elevational view of the apparatus shown in FIGS. 1-4 with a plasma arc cutting head in position for cutting operation and the laser beam cutting head retracted.

As seen in FIGS. 4 and 5, the telescoping tube 36 of the laser beam delivery system shortens in length to accommodate the shifting movement of the laser beam cutting head 16.

Figure 6:
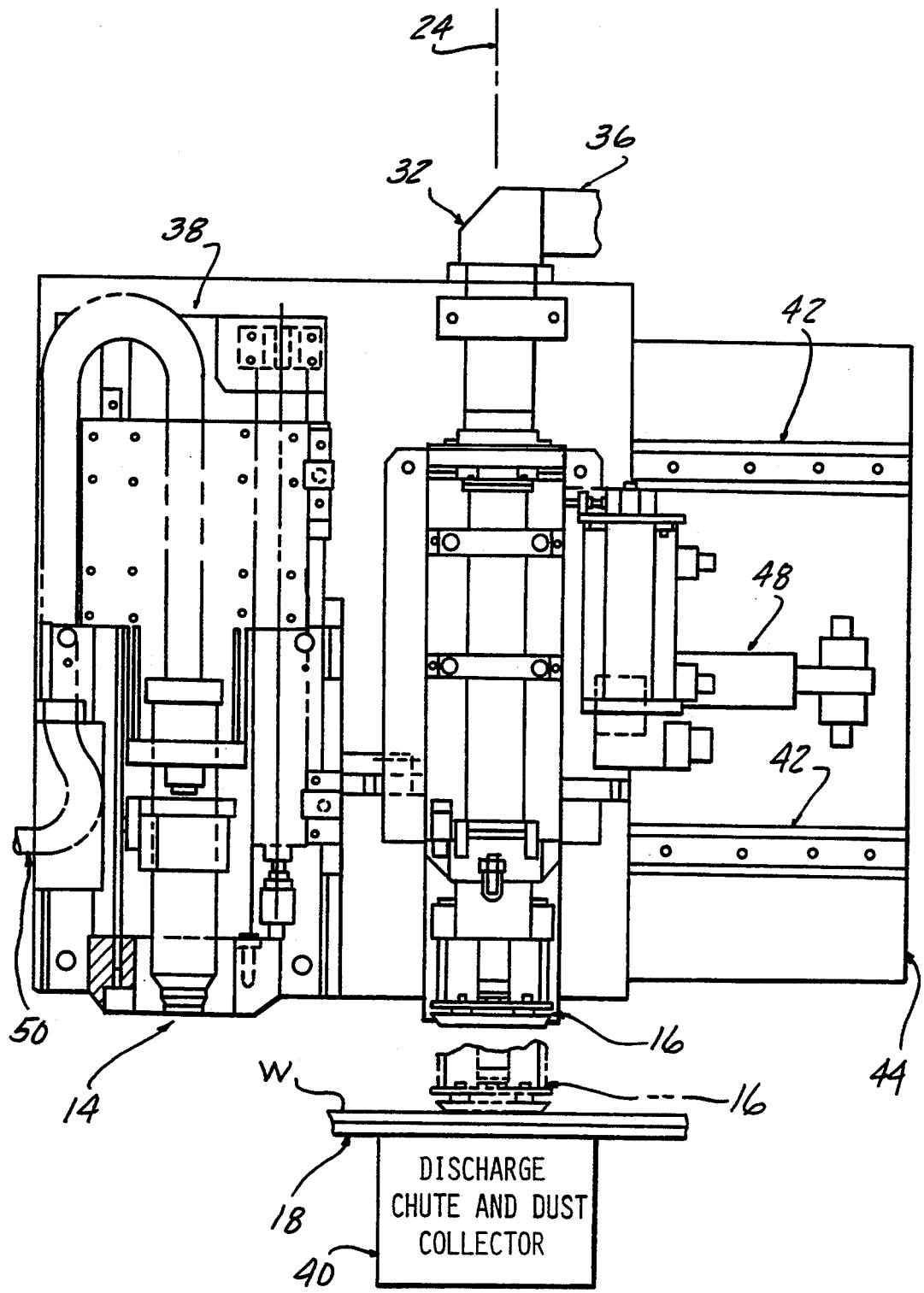
FIG. 6 is a front elevational enlarged view of the plasma arc cutting head and laser beam cutting head mounted to the shuttle mechanism according to present invention together with a fragmentary depiction of the workpiece support table and a diagrammatic representation of the discharge chute showing the laser beam cutting head in cutting position and also shown in phantom extended for cutting operation.
Figure 8:
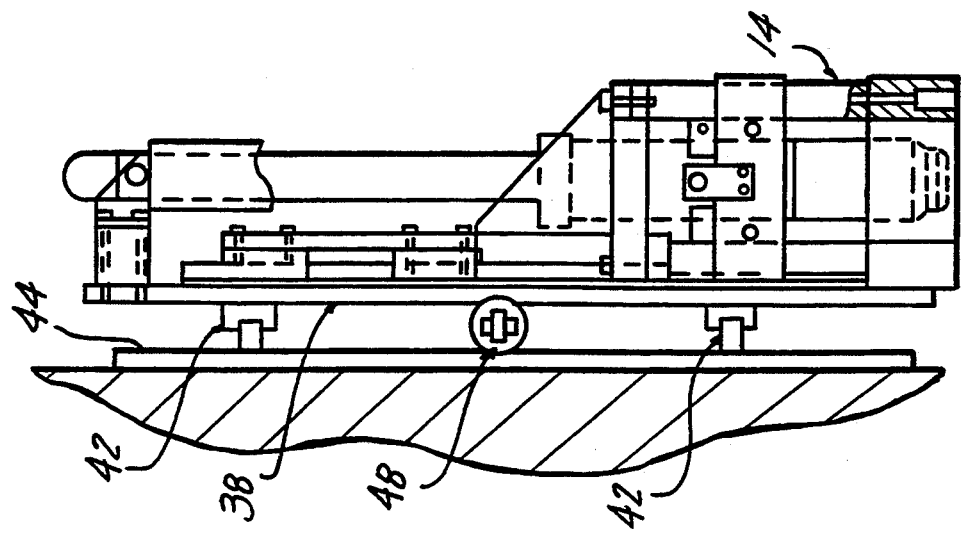
FIG. 8 is a side elevational view of the plasma arc cutting head shown mounted to the shuttle mechanism according to the present invention.

Referring to FIGS. 6–8, the details of the arrangement whereby the plasma arc cutting head 14 and the laser beam cutting head 16 are mounted for shuttling movement into and out of position for cutting are shown.

A cutting head carrier shuttle plate 38 is provided onto which the plasma arc cutting head 14 and the laser beam cutting head 16 are each mounted. Each of the plasma arc cutting head 14 and the laser beam cutting head 16 are mounted thereon for vertical motion inasmuch as the cutting heads are lowered into close proximity or touching contact with the workpiece surface during the cutting operation. Such positioning arrangements are well known in the art.

In FIG. 6 the laser beam cutting head 16 is shown in phantom in the lowered position in contact with the workpiece W upper surface.

A suitable slag discharge chute 40 is depicted diagrammatically, located at the cutting station, such cutting chutes and structures well known in the art. See for example, U.S. Pat. No. 5,034,592 issued on Jul. 23, 1991, for a "Process and Apparatus for Reducing Slag Buildup on Chute Surfaces", and U.S. Pat. No. 5,053,600 issued on Oct. 1, 1991, for a "Slag Chute System".

The plasma arc cutting head 14 and laser beam cutting head 16 are mounted vertically and side-by-side on the shuttle carrier plate 38 as indicated in FIG. 6. The carrier plate 38 in turn is mounted on a pair of parallel linear guides 42 affixed to a base plate 44, fixed to a frame structure 46 of the press 10.

A shuttle cylinder 48 is provided for actuating movement of the carrier plate 38 back and forth horizontally on the linear guides 42, such as to position either the plasma arc cutting head 14 or the laser head cutting beam 16 on the punch center line 24 and aligned with the cutting station and slag discharge chute 40.

The telescoping tube 36 is adapted to accommodate a lengthening as the laser beam cutting head 16 is shifted to the left as viewed in FIG. 6 in moving out of the retracted position.

The plasma arc cutting head 14 has a flexible tube connection 50 providing electrical leads as well as coolant lines, etc. necessary for operation of the plasma arc cutting head 14.

The laser beam cutting head 16 is also provided with suitable supply tubing 52 from a source of assist gas 54, all in the well known manner.

Figure 11:
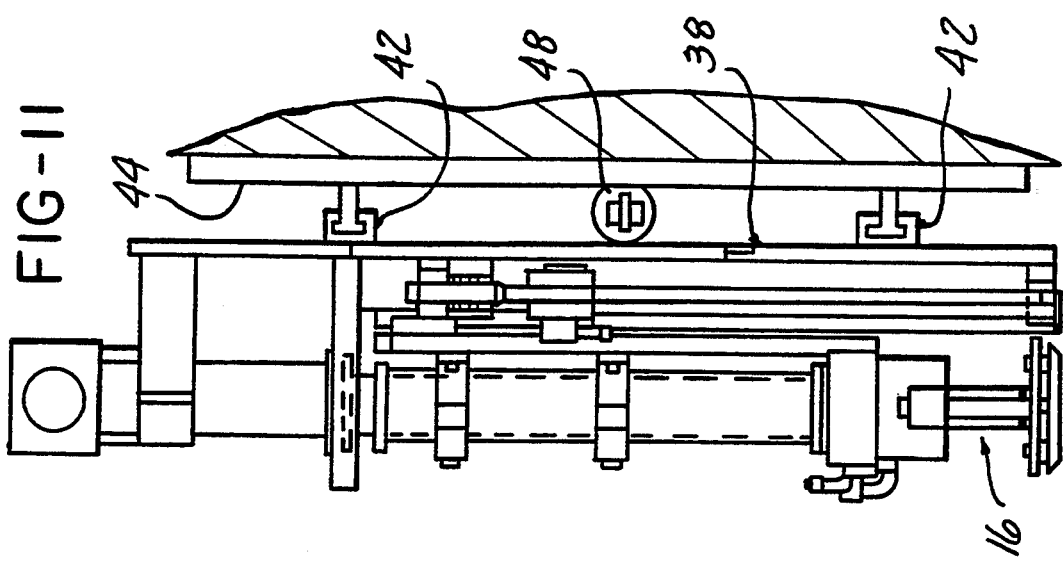
FIG. 11 is a side elevational view of the laser beam cutting head and shuttle mounting mechanism with the laser beam in the retracted idle position.
Figure 10:
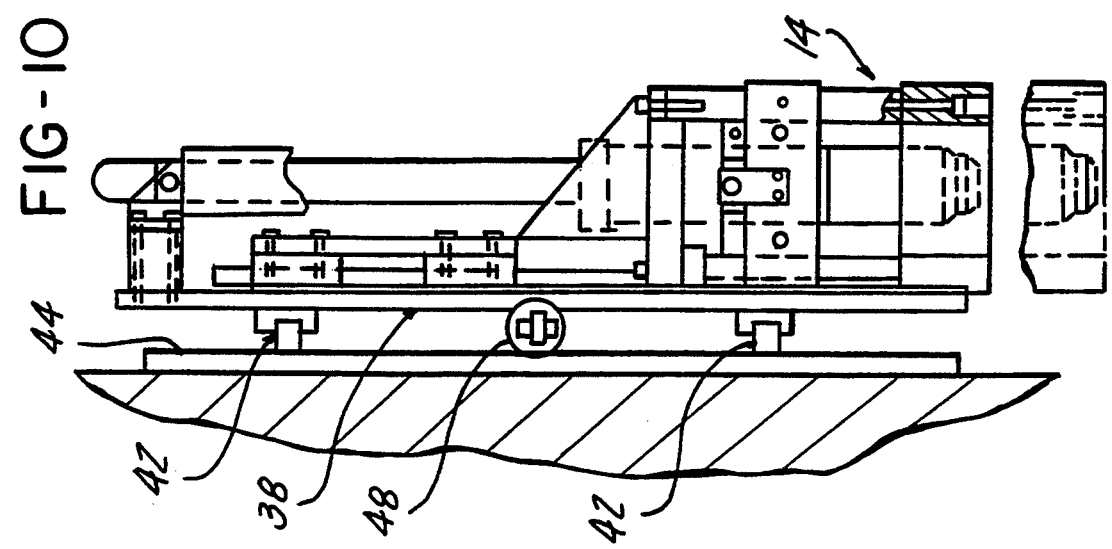
FIG. 10 is a side elevational view of the plasma arc cutting head and shuttle mounting mechanism with the shuttle plasma arc cutting head shown lowered in phantom to the position assumed during plasma arc cutting.
Figure 9:
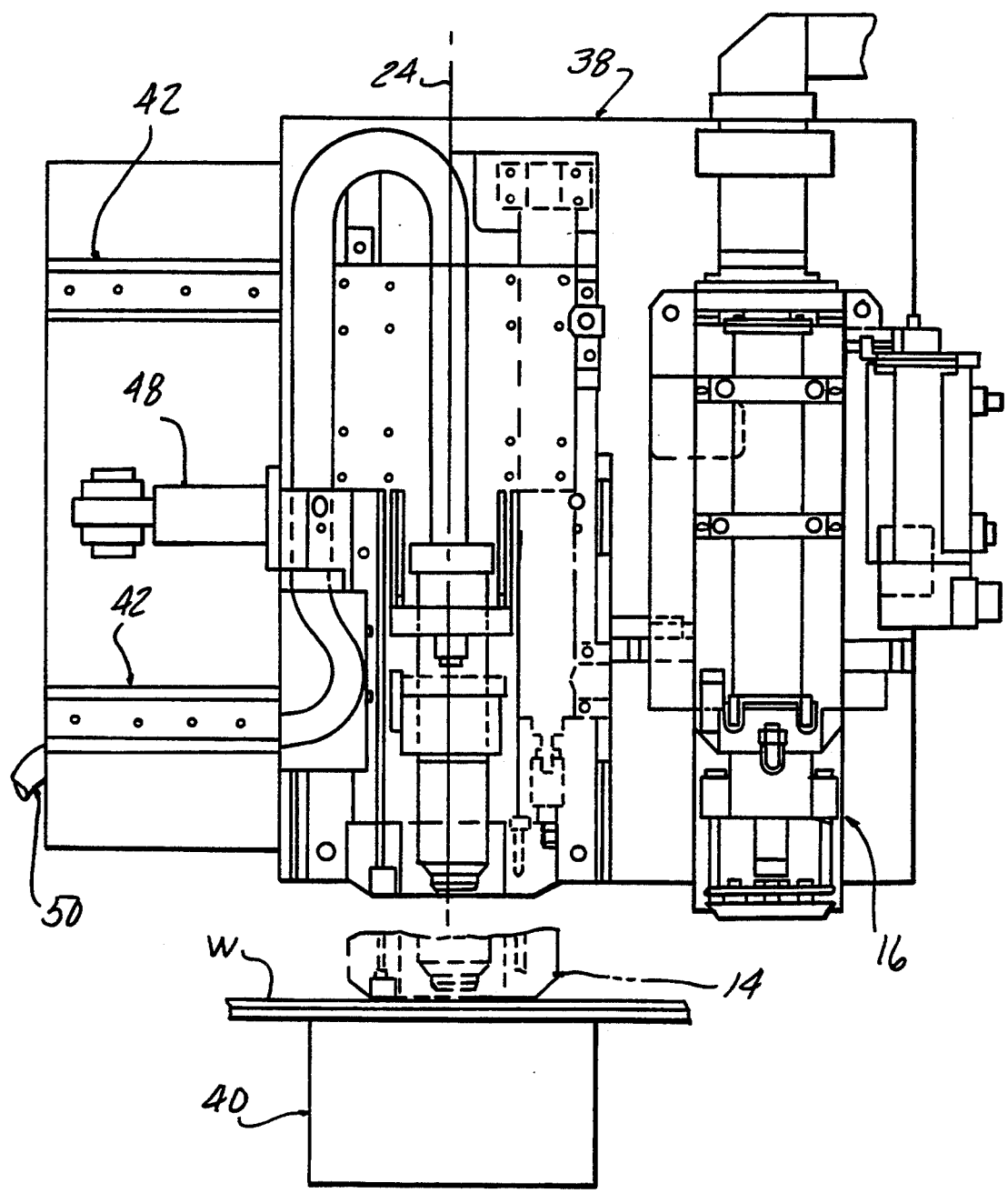
FIG. 9 is a front elevational view of the laser beam plasma arc cutting head shuttle mechanism showing the plasma arc cutting head in position for cutting and the laser beam cutting head shifted to the idle position with the plasma cutting head shown in fragmentary form in phantom in the lowered position assumed during plasma arc cutting.

FIGS. 9–11 show the plasma arc cutting head 16 shuttled into the operative position on the center line of the punch press 24 with the laser beam cutting head 16 shifted to the idle, nonoperating position to the right as viewed in FIG. 9.

The plasma arc cutting head 14 is shown extended in the operative cutting condition in phantom in FIG. 9.

Accordingly, it can be appreciated that both a laser beam and plasma arc cutting capability will be afforded in combination with a punch press such as to greatly increase the flexibility of the use of the equipment. The common controls, table, frame, and slag discharge chute provide a very substantial cost saving over providing such devices singly and may substantially improve the efficiency of the manufacturing process for certain types of projects. The shuttle system also prevents loss of table space which would result if there were separate fixed locations for the plasma arc and laser beam cutting heads.

At the same time, the arrangement is relatively simple and should be trouble free in production use.

I claim:

1. A hybrid cutting apparatus for cutting sheet material workpieces comprising:
   a workpiece support table;
   a cutting station located above said support table;
   a carriage-gripper means engageable with a sheet material workpiece and adapted to controllably move said workpiece on said table so as to position a selected point on said workpiece at said cutting station;
   a laser beam cutting head;
   a laser beam source generating a high energy cutting laser beam;
   beam transport means for directing said generated laser beam to said laser beam cutting head;
   a plasma arc cutting head;
   power supply means for providing electrical energy to said plasma arc cutting head for operation thereof;
   a vertically disposed carrier plate positioned above said cutting station;
   said laser beam and plasma arc cutting heads mounted side-by-side on said carrier plate;
   support means supporting said carrier shuttle plate for horizontal reciprocal movement between first and second shifted positions bringing one or the other of said laser beam or plasma arc cutting heads respectively into alignment with said cutting station in said first and second shifted positions of said carrier shuttle plate;
   a common discharge chute at said cutting station for receiving the cutting debris produced by either said laser beam cutting head or said plasma arc cutting head; and
   actuator means for powering said movement of said shuttle carrier plate whereby either said laser beam or plasma arc cutting head may be selectively employed at said cutting station.

2. The cutting apparatus according o claim 1 in combination with a punch press including a punching station offset with respect to said cutting station and punching tooling enabling punching operations to be conducted on said workpiece as well as laser beam or plasma arc cutting.

3. The cutting apparatus according to claim 1 wherein said beam transport means includes a telescoping tube aligned to accommodate said side-to-side motion of said carrier shuttle plate.

4. The cutting apparatus according to claim 1 wherein both said cutting heads are mounted to allow vertical retraction thereof when not in use.

* * * * *

UNITED STATES PATENT AND TRADEMARK OFFICE
CERTIFICATE OF CORRECTION

PATENT NO. : 5,350,897
DATED : September 27, 1994
INVENTOR(S) : Victor L. Chun

It is certified that error appears in the above-identified patent and that said Letters Patent is hereby corrected as shown below:

Claim 2, Column 6, line 20, "o" should be --to--.

Signed and Sealed this

Thirteenth Day of June, 1995

Attest:

BRUCE LEHMAN

Attesting Officer

Commissioner of Patents and Trademarks